United States Patent
Kalavala et al.

(10) Patent No.: US 11,728,538 B2
(45) Date of Patent: Aug. 15, 2023

(54) POWER TOOL BATTERY PACK RECEPTACLE

(71) Applicant: TECHTRONIC CORDLESS GP, Anderson, SC (US)

(72) Inventors: Krishna Sai Teja Kalavala, Greenville, SC (US); Elton L. Watson, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 226 days.

(21) Appl. No.: 17/029,525

(22) Filed: Sep. 23, 2020

(65) Prior Publication Data

US 2022/0093900 A1   Mar. 24, 2022

(51) Int. Cl.
  *H01M 50/20*   (2021.01)
  *B25F 5/02*    (2006.01)
  *F16N 3/12*    (2006.01)
  *F16N 5/00*    (2006.01)

(52) U.S. Cl.
  CPC ............... *H01M 50/20* (2021.01); *B25F 5/02* (2013.01); *F16N 3/12* (2013.01); *F16N 5/00* (2013.01); *H01M 2220/30* (2013.01)

(58) Field of Classification Search
  CPC ............. H01M 50/20; H01M 2220/30; H01M 50/244; H01M 50/262; H01M 50/271; H01M 50/296; H01M 50/207; H01M 50/233; H01M 50/247; B25F 5/02; F16N 3/12; F16N 5/00
  See application file for complete search history.

(56) References Cited

U.S. PATENT DOCUMENTS

| | | |
|---|---|---|
| 8,237,404 B2 | 8/2012 | Takano et al. |
| 8,354,183 B2 | 1/2013 | Konuma et al. |
| 9,065,155 B2 | 6/2015 | Takano et al. |
| 9,189,663 B2 | 11/2015 | Goren et al. |
| 9,318,729 B2 | 4/2016 | Ogura |
| 9,449,268 B2 | 9/2016 | Goren et al. |
| 9,502,801 B2 | 11/2016 | Ogura |
| 9,547,965 B2 | 1/2017 | Goren et al. |
| 9,672,708 B2 | 6/2017 | Goren et al. |

(Continued)

FOREIGN PATENT DOCUMENTS

| | | |
|---|---|---|
| AU | 2020101751 A4 | 9/2020 |
| DE | 102018219390 A1 | 5/2020 |
| EP | 3603899 A1 | 2/2020 |

OTHER PUBLICATIONS

Extended European Search Report for Application No. 21197546.1 dated Feb. 22, 2022 (17 pages).

*Primary Examiner* — Michael L Dignan
(74) *Attorney, Agent, or Firm* — Michael Best & Friedrich LLP (57) ABSTRACT

A power tool battery pack receptacle includes a cavity in which a portion of a battery pack is receivable, an insertion end, a closed end opposite the insertion end along an insertion axis of the battery pack, and a rail extending between the insertion end and the closed end. The rail includes a first portion having a variable height and a second portion having a substantially constant height. The first portion is positioned adjacent the insertion end and the second portion is spaced from the insertion end. The rail is configured to be received within a groove of the battery pack.

6 Claims, 7 Drawing Sheets

(56) References Cited

U.S. PATENT DOCUMENTS

| | | |
|---|---|---|
| 9,779,601 B2 | 10/2017 | Goren et al. |
| 9,871,370 B2 | 1/2018 | Friedman et al. |
| 9,875,629 B2 | 1/2018 | Goren et al. |
| 9,954,418 B2 | 4/2018 | Kawakami et al. |
| 10,363,614 B2 | 7/2019 | O'Sullivan et al. |
| 10,454,264 B2 | 10/2019 | Friedman et al. |
| 10,483,506 B2 | 11/2019 | Klee et al. |
| 10,540,874 B2 | 1/2020 | Goren et al. |
| 10,632,589 B2 | 4/2020 | Fisher et al. |
| 11,374,528 B2 * | 6/2022 | Sheeks ................ H01M 10/482 |
| 2009/0180829 A1 * | 7/2009 | Rejman .................... B25F 5/02 |
| | | 403/331 |
| 2017/0373288 A1 | 12/2017 | Klee et al. |
| 2018/0169851 A1 * | 6/2018 | Radovich .......... H01M 10/4257 |
| 2018/0175458 A1 | 6/2018 | Radovich et al. |
| 2018/0205293 A1 | 7/2018 | Kawakami et al. |
| 2018/0370014 A1 * | 12/2018 | Roehm .................... B25F 5/02 |
| 2019/0232478 A1 | 8/2019 | Zawisza et al. |
| 2020/0052479 A1 | 2/2020 | Friedman et al. |
| 2020/0055177 A1 | 2/2020 | Scott et al. |
| 2020/0061791 A1 | 2/2020 | Van Hoorn |
| 2020/0061792 A1 | 2/2020 | Van Hoorn |
| 2020/0130161 A1 | 4/2020 | Zawisza et al. |
| 2020/0176724 A1 | 6/2020 | Mao et al. |
| 2020/0176827 A1 | 6/2020 | Mao et al. |
| 2020/0223026 A1 | 7/2020 | Fisher et al. |
| 2020/0295506 A1 * | 9/2020 | Marx ................... H01R 13/422 |
| 2021/0347031 A1 * | 11/2021 | Braun ................ H01M 50/247 |

* cited by examiner

POWER TOOL BATTERY PACK RECEPTACLE

FIELD OF THE DISCLOSURE

The present disclosure relates to a power tools, and more particularly to power tools including a battery pack receptacle for receiving a battery pack.

SUMMARY OF THE DISCLOSURE

In one embodiment, a power tool battery pack receptacle includes a cavity in which a portion of a battery pack is receivable, an insertion end, a closed end opposite the insertion end along an insertion axis of the battery pack, and a rail extending between the insertion end and the closed end. The rail includes a first portion having a variable height and a second portion having a substantially constant height. The first portion is positioned adjacent the insertion end and the second portion is spaced from the insertion end. The rail is configured to be received within a groove of the battery pack.

In another embodiment, a power tool battery pack receptacle includes a cavity in which a portion of a battery pack is receivable, an insertion end, a closed end opposite the insertion end along an insertion axis of the battery pack, and a rail extending between the insertion end and the closed end. The rail includes a plurality of steps positioned adjacent the insertion end, and the rail is configured to be received within a groove of the battery pack.

In another embodiment, a power tool battery pack receptacle includes a cavity in which a portion of a battery pack is receivable. The cavity is defined in part by a first wall, a second wall, and an intermediate wall coupled between the first wall and the second wall. The battery pack receptacle further includes an insertion end, a closed end opposite the insertion end along an insertion axis of the battery pack. The battery pack receptacle further includes a rail coupled to the first wall and extending between the insertion end and the closed end. The rail defines a guide surface. A groove is defined between the intermediate wall and the guide surface of the rail, and the groove has a first portion and a second portion. The first portion of the groove is positioned adjacent the insertion end and defines a distance that gradually decreases from the insertion end to the second portion. The second portion of the groove defines a substantially constant distance from the first portion to the closed end. The rail is configured to be received within a groove of the battery pack, and the receptacle groove is configured to receive a rail of the battery pack.

Before any independent embodiments of the present subject matter are explained in detail, it is to be understood that the present subject matter is not limited in its application to the details of construction and the arrangement of components set forth in the following description or illustrated in the following drawings. The present subject matter is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
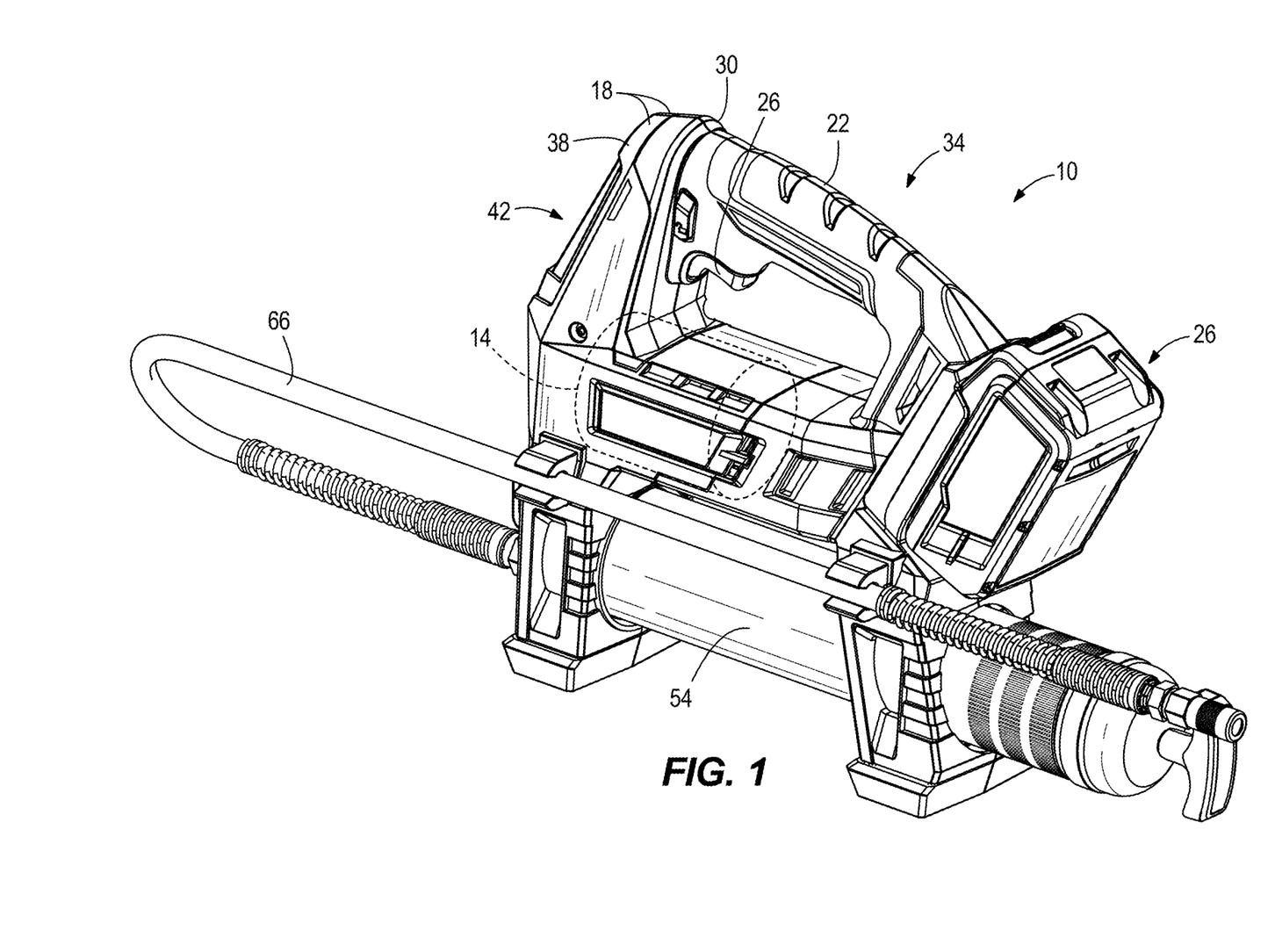
FIG. 1 is a perspective view of a power tool and a battery pack coupled thereto.
Figure 2:
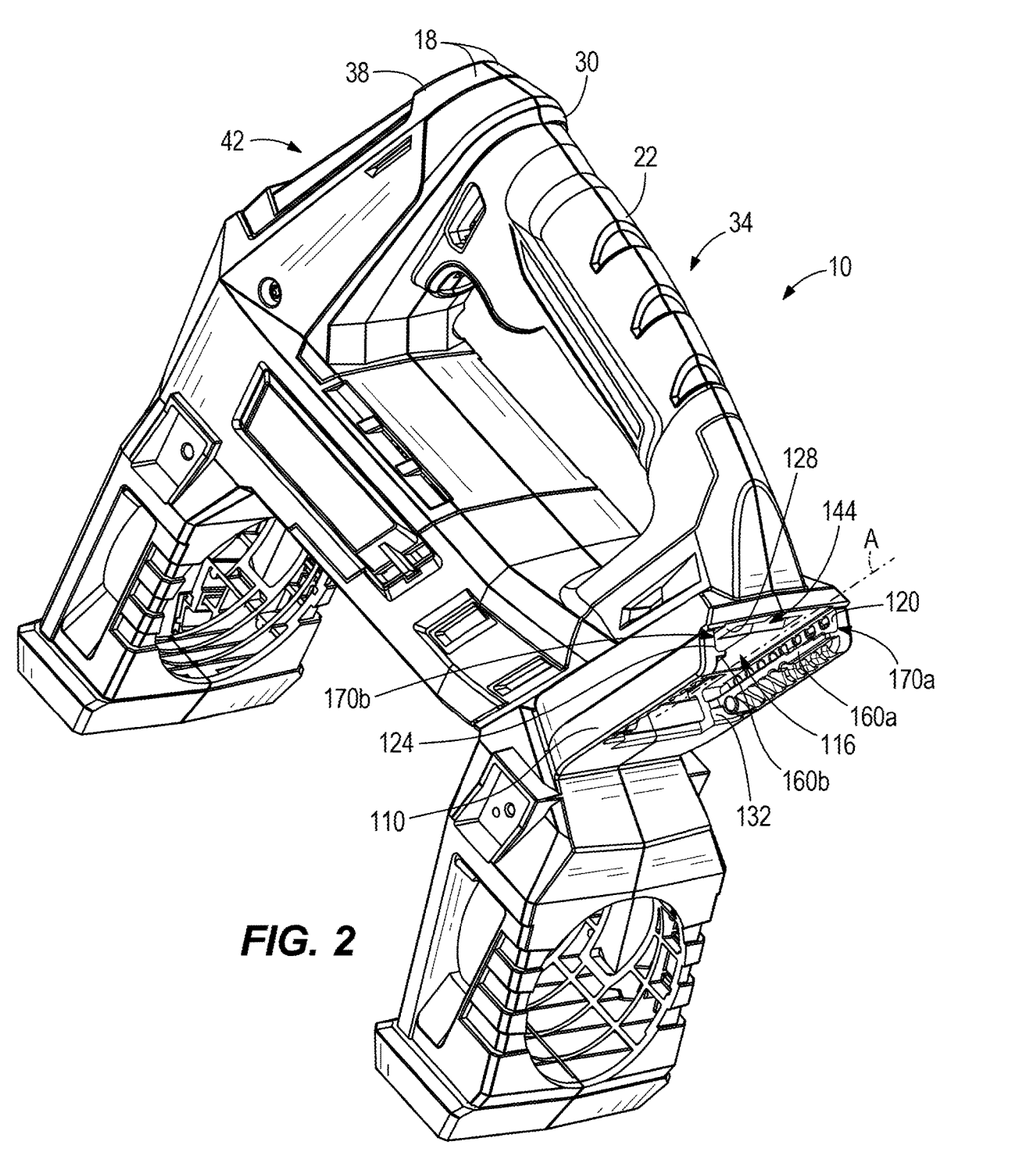
FIG. 2 is a perspective view of the power tool of FIG. 1 with the battery pack removed, illustrating a battery pack receptacle according to one embodiment.

FIG. 1 illustrates a power tool 10 including an electric motor 14 (shown schematically in broken lines) located within a housing 18. The housing 18 includes a handle 22 that has an actuator 26 (e.g., a button or trigger) operable to activate the motor 14. In the illustrated embodiment, the housing 22 includes a first housing portion 30 (e.g., a first clamshell half) that defines a first side 34 of the tool 10 and a second housing portion 38 (e.g., a second clamshell half) that defines a second side 42 of the tool 10. The first housing portion 30 is coupled (e.g., by fasteners or the like) to the second housing portion 38 to enclose the motor 14. In other embodiments, the housing 18 may have other suitable configurations. Each housing portion 30, 38 is formed of plastic; however, in some embodiments, the housing portions 30, 38 may be formed of other materials. The handle 22 includes at least one grip surface configured to be grasped by a user. In the illustrated embodiment, the power tool 10 is a grease gun. When the trigger 26 is actuated, the motor 14 causes a drive mechanism (not shown) to move grease from a container 54 and expels grease from a hose 66. The power tool 10 illustrated herein is merely exemplary. In other embodiments, the power tool 10 may be configured as any of a number of different tools.

Figure 3A:
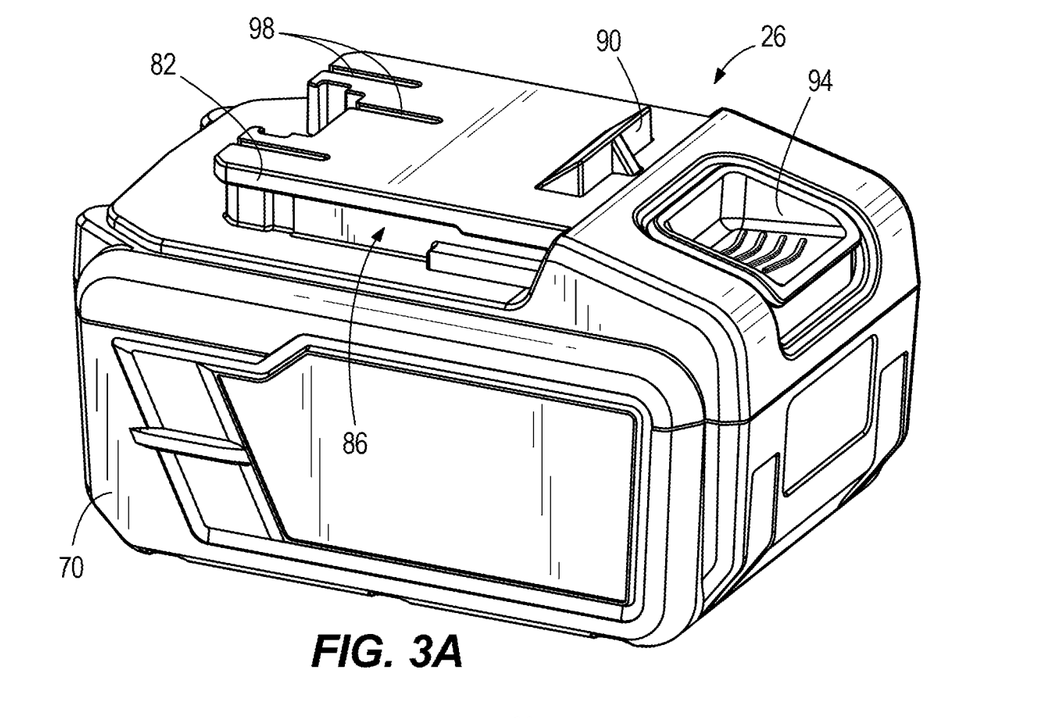
FIG. 3A is a perspective view of the battery pack of FIG. 1.
Figure 3B:
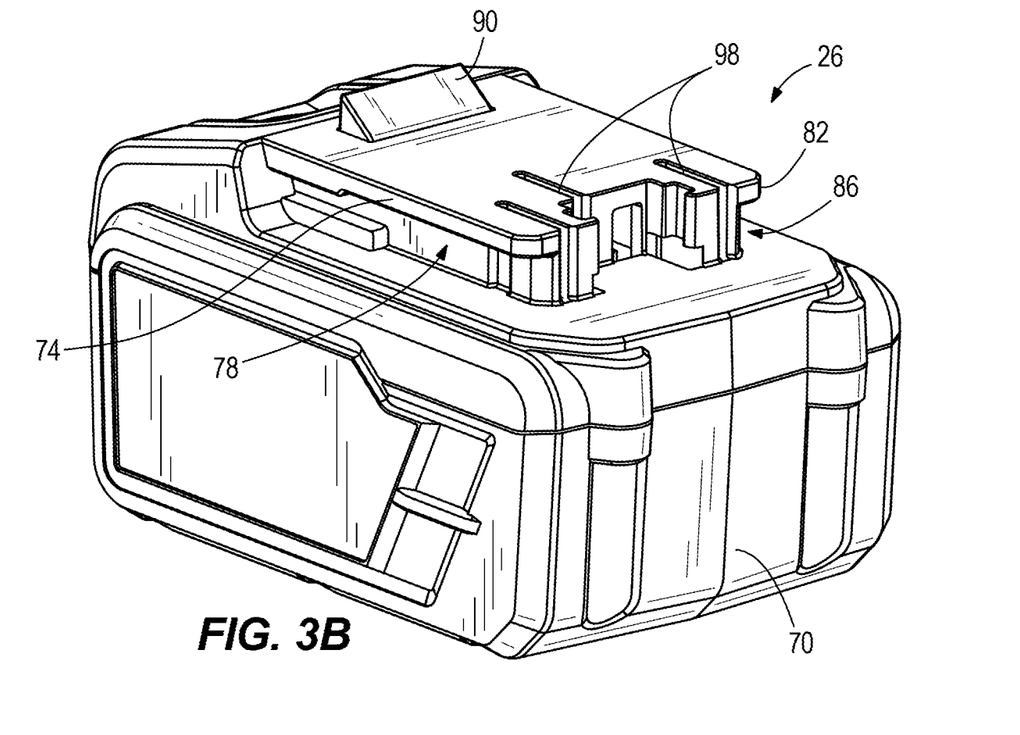
FIG. 3B is a reverse perspective view of the battery pack of FIG. 3A.
Figure 4:
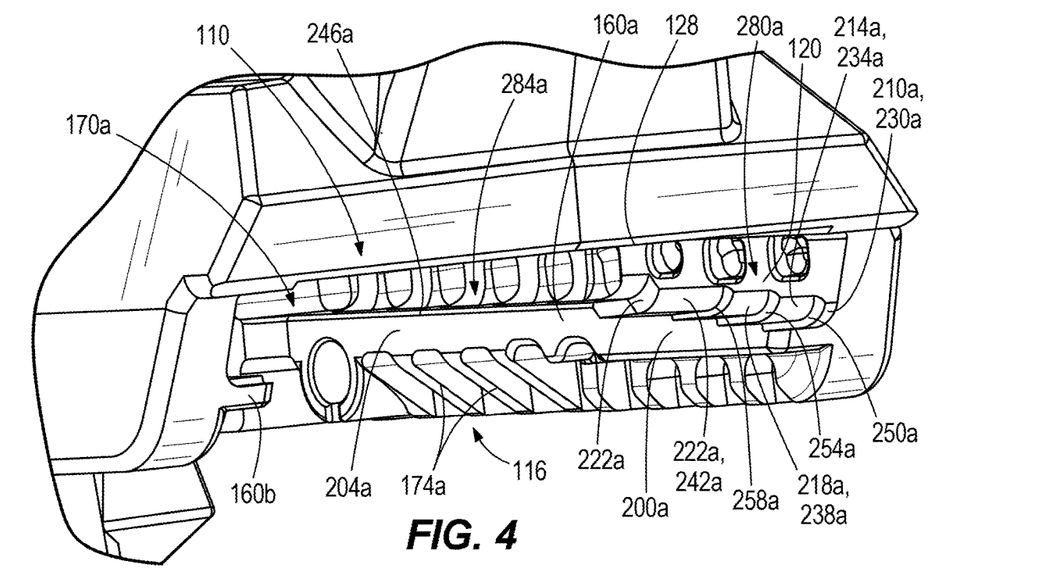
FIG. 4 is an enlarged perspective view of one side of the battery pack receptacle of the power tool of FIG. 1.
Figure 5:
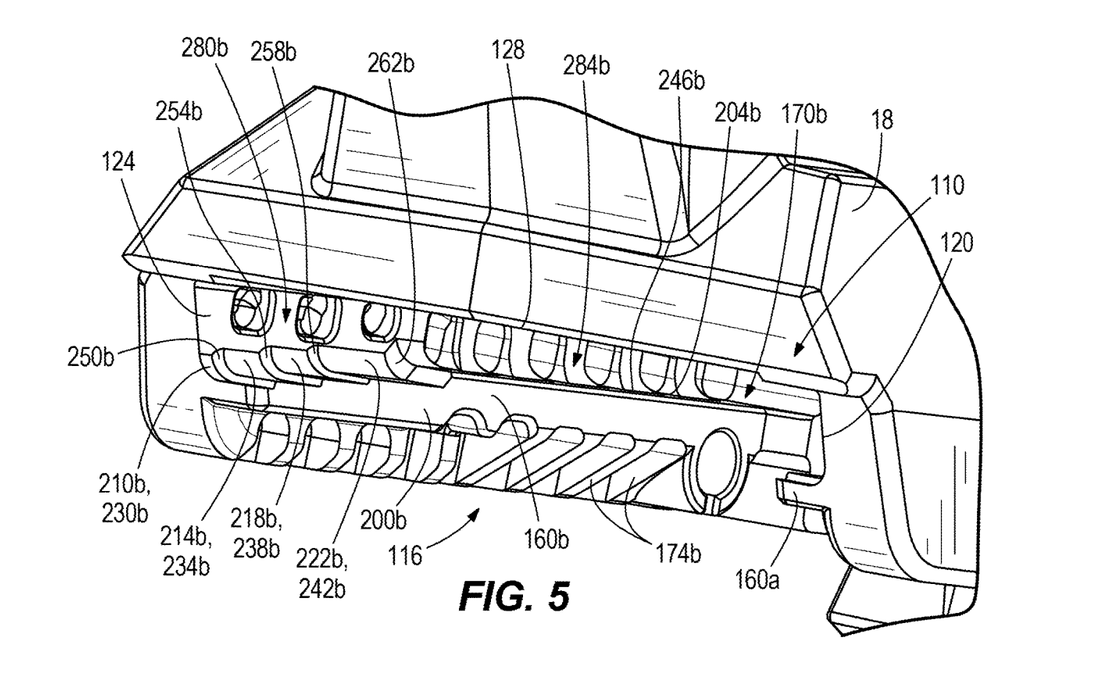
FIG. 5 is an enlarged perspective view of another side of the battery pack receptacle of the power tool of FIG. 1.

With continued reference to FIG. 1, the housing 18 supports and/or retains a battery pack 26, which supplies electrical power to the motor 14. As shown in FIGS. 3A and 3B, in the illustrated embodiment, the battery pack 26 is a slide-on-type battery pack 26 including a housing 70 having a rail and groove structure on opposite sides thereof. That is, a first rail 74 and a first groove 78 extend along at least a portion of a length of the housing 70 on a first side. Similarly, a second rail 82 and a second groove 86 extend along at least a portion of the length of the housing 70 on a second side opposite the first side. Additionally, the battery pack 26 includes a latch mechanism having a latch 90 and a latch actuator 94. The latch 90 extends from a top surface of the housing 70. The latch actuator 90 is movable to move the latch 90 between a locking position in which the latch 90 extends from the housing 70 and a release position in which the latch 90 is at least partially retracted within the housing 70. The battery pack 26 further includes a terminal block (not shown) that is positioned within the housing 70. The terminal block supports battery pack terminals (not shown), each of which is accessible through openings 98 in the housing 70. The terminals are in electrical communication with a plurality of battery cells (not shown) and a battery controller (not shown).

The battery pack 26 may be configured having any of a number of different voltages (e.g., 4 volts, 12 volts, 18 volts, and/or the like) depending upon the range of applications of the power tool 10 and may utilize any of a number of different chemistries (e.g., lithium-ion, nickel-cadmium, and/or the like). The battery pack 26 is also removable from the housing 18 for charging by a separate battery pack charger. The battery pack 26 may also be interchangeable with a variety of other power tools (e.g., saws, flashlights, drivers, and/or the like) to supply power to the power tools.

Figure 6:
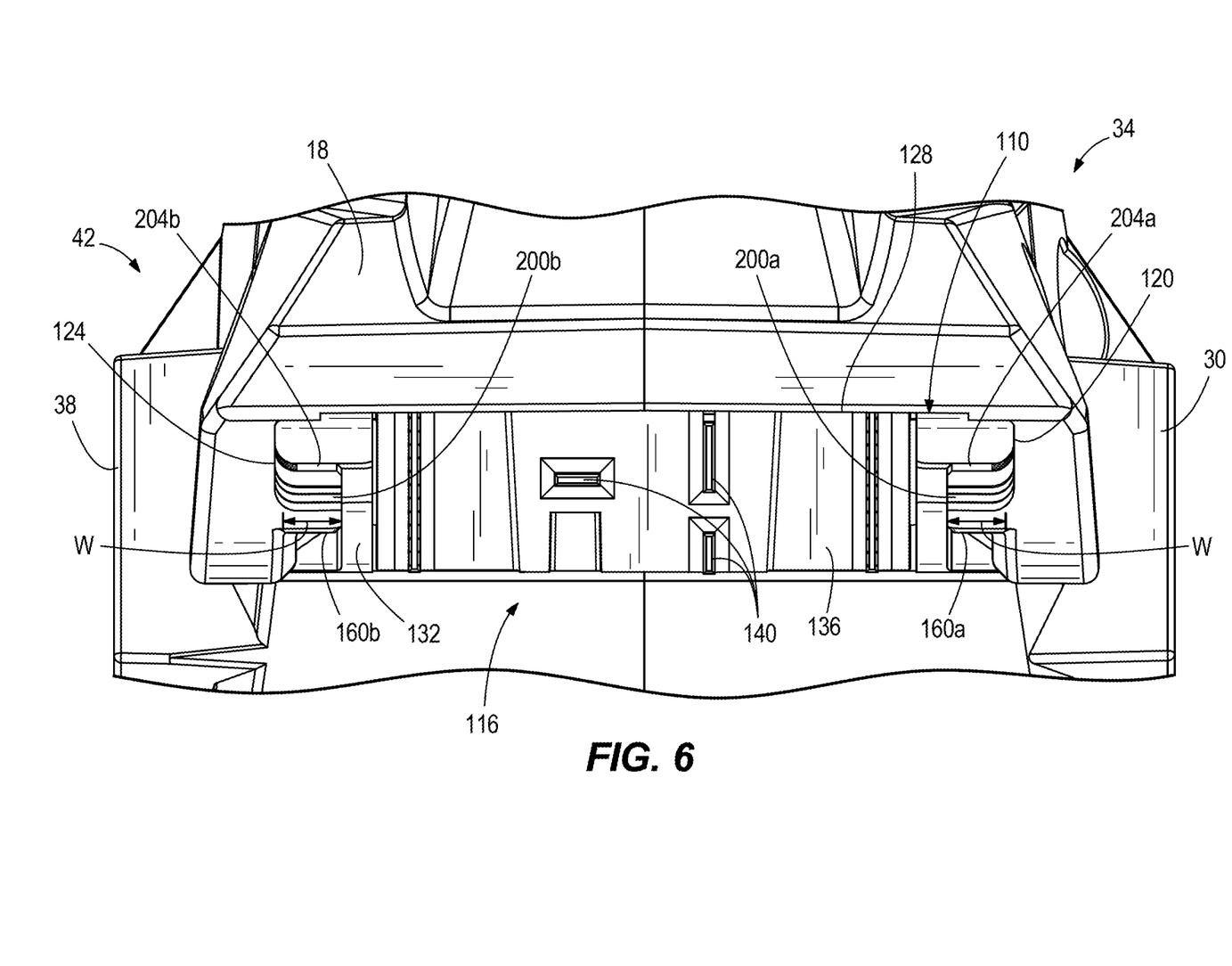
FIG. 6 is an elevation view of an insertion end of the battery pack receptacle of the power tool of FIG. 1.

As shown in FIGS. 2 and 4-7, the housing 18 includes a battery pack receptacle 110 that defines a cavity 116 for removably receiving a portion of the battery pack 26. In the illustrated embodiment, the battery pack receptacle 110 is formed with or adjacent to the handle 22. The battery pack receptacle 110 includes first wall 120 and a second wall 124 extending from opposite sides of a third intermediate wall 128. A fourth wall 132 is coupled to the third wall 128 and positioned between the first wall 120 and the second wall 124. The fourth wall 124 defines a closed end of the battery pack receptacle 110. A terminal block 136 is supported by the third wall 128 adjacent the fourth wall 132 (FIG. 6). The terminal block 136 includes electrical terminals 140 that are configured to mate with the terminals of the battery pack 26. An insertion end of the battery pack receptacle 110 is positioned opposite the fourth wall 132. The third wall 128 includes a latch opening 144 (FIG. 2) positioned adjacent the insertion end for receiving the latch 90 of the battery pack 26. The cavity 116 defines an insertion axis A between the first wall 120 and the second wall 124.

As shown, the first housing portion 30 defines a first side of the battery pack receptacle 110 and the second housing portion 38 defines a second side of the battery pack receptacle 110. Accordingly, the first housing portion 30 includes a portion of each of the first wall 120, the third wall 128, and the fourth wall 132 and the second housing portion 38 includes a portion of each of the second wall 124, the third wall 128, and the fourth wall 132.

Further with respect to FIGS. 2 and 4-7, a first rail 160a is coupled to the first wall 120 and extends between the insertion end and the closed end, and a second rail 160b is coupled to the second wall 124 and extends between the insertion end and the closed end. In the illustrated embodiment, one or more reinforcement members 174a, 174b (FIGS. 4 and 5) may extend between the respective first and second walls 120, 124 and the first and second rails 160a, 160b. A first groove 170a is defined between the first rail 160a and the third wall 128, and a second groove 170b is defined between the second rail 170b and the third wall 128. The first rail 160a of the power tool 10 is configured to be received within the first groove 78 of the battery pack 26, while the first groove 170a of the power tool is configured to receive the first rail 74 of the battery pack 26. The second rail 160b of the power tool 10 is configured to be received within the second groove 86 of the battery pack 26, while the second groove 170b of the power tool 10 is configured to receive a second rail 82 of the battery pack 26. Each of the first and second rails 160a, 160b defines guide surfaces for the respective rails 74, 82 of the battery pack 26.

As shown in FIGS. 2 and 4-7, the first rail 160a and the second rail 160b of the power tool 10 are substantially the same. Similarly, the first groove 170a and the second groove 170b are substantially the same. Therefore, although only the first rail 160a and the first groove 170b are discussed in detail, it should be understood that the discussion of the first rail 160a and the first groove 170a applies, respectively, to the second rail 160b and the second groove 170b as well.

Figure 7:
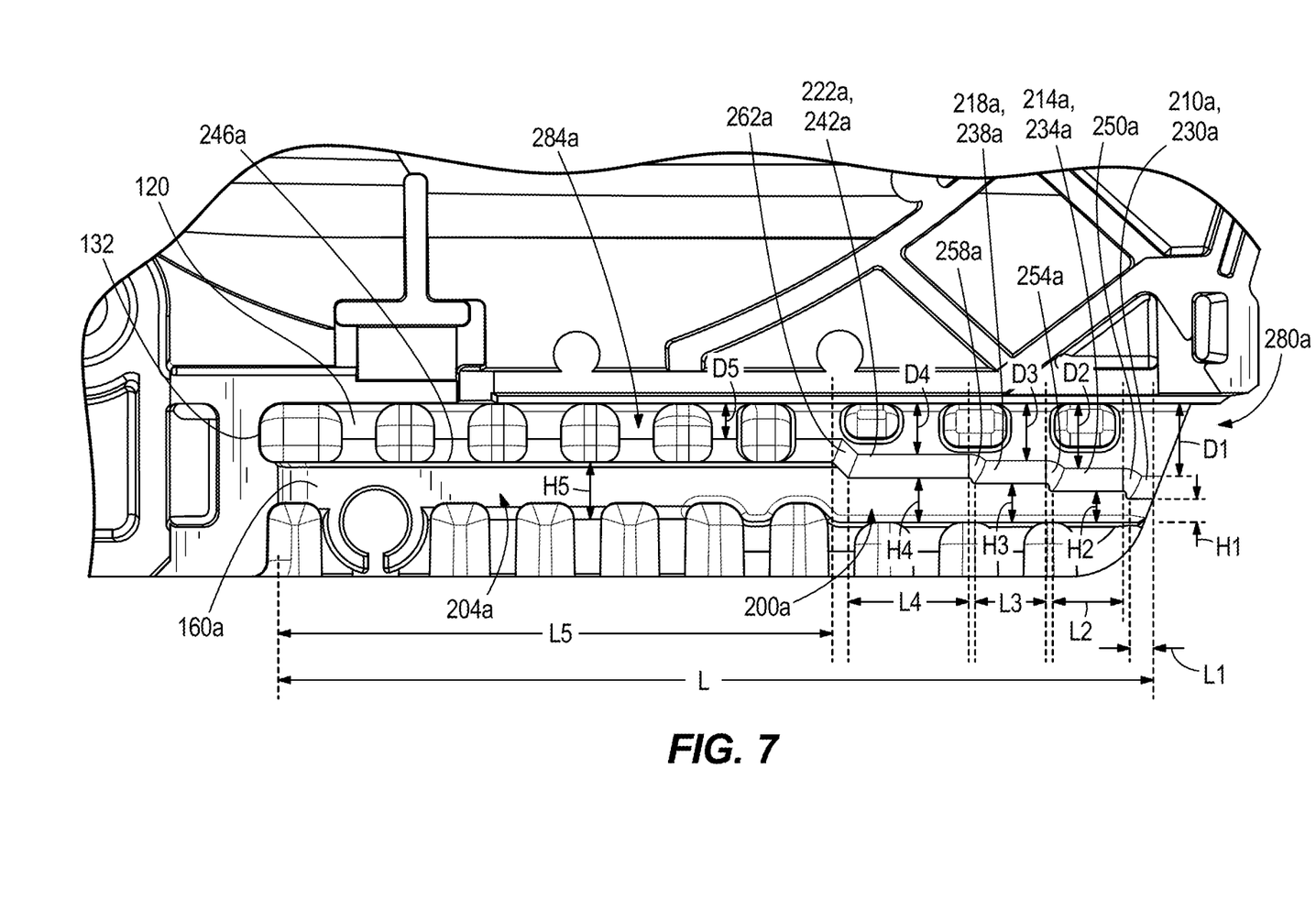
FIG. 7 is an enlarged side view one of the sides of the battery pack receptacle of the power tool of FIG. 1.

The first rail 160a includes a width W (FIG. 6) that is substantially constant along its length L (FIG. 7) between the insertion end and the closed end. The first rail 160a further includes a variable-height portion 200a that defines a variable rail height and a constant-height portion 204a that defines a substantially constant rail height. In the embodiment of FIGS. 1-2 and 4-7, the variable-height portion 200a is a stepped portion having a plurality of steps and the constant-height portion 204a is a non-stepped portion. The stepped portion 200a is positioned adjacent the insertion end and the non-stepped portion 204a is spaced from the insertion end. As shown in FIG. 7, the stepped portion 200a defines less of the length L of the first rail 160a than the non-stepped portion 204a. In some embodiments, the stepped portion 200a defines less than half of the length L of the first rail 160a, while the non-stepped portion 204a defines more than half of the length L of the first rail 160a. In some embodiments, the stepped portion 200a defines less than a third of the length L of the first rail 160a, while the non-stepped portion 204a defines more than a third of the length L of the first rail 160a.

The stepped portion 200a includes a plurality of steps 210a, 214a, 218a, 222a. In the illustrated embodiment, the stepped portion 200a includes four steps. In other or additional embodiments, the plurality of steps may include greater or fewer steps. Each of the plurality of steps 210a, 214a, 218a, 222a defines a height such that an overall height of the rail 160a increases from the insertion end to the non-stepped portion 204a. In other words, a first step 210a defines a first height H1, a second step 214a spaced from the first step 210a defines a second height H2, a third step 218a spaced from the second step 214a defines a third height H3, and a fourth step 222a spaced from the third step 218a defines a fourth height H4. The first height H1 is less than the second height H2. The second height H2 is less than the third height H3. And, the third height H3 is less than the fourth height H4. The first step 214a is positioned at the insertion end and the fourth step 222a is positioned adjacent the non-stepped portion 204a. The non-stepped portion 204a is essentially a single step and defines a fifth height H5 that is greater than the fourth height H4. The height H5 of the non-stepped portion 204a is substantially constant. The difference between consecutive heights H1-H5 of the plurality of steps 210a, 214a, 218a, 222a is about 0.5 mm in the illustrated embodiment.

As shown, each of the plurality of steps includes a surface 230a, 234a, 238a, 242a and the non-stepped portion 204a includes a surface 246a. In the illustrated embodiment, each of the surfaces 230a, 234a, 238a, 242a of each of the plurality of steps 210a, 214a, 218a, 222a transitions to an adjacent surface by an inclined surface 250a, 254a, 258a. Additionally, a surface of the stepped portion 200a (e.g., the surface 222a of the fourth step 218a) transitions to the surface 246a of the non-stepped portion 204a by an inclined surface 262a. Collectively, the surfaces 230a, 234a, 238a, 242a of the plurality of steps 210a, 214a, 218a, 222a, the surface 246a of the non-stepped portion 204a, and the inclined surfaces 250a, 254a, 258a, 262a define a first guide surface.

Also, in the illustrated embodiment, the lengths of the surfaces 230a, 234a, 238a, 242a of the stepped portion 200a are different from one another. For example, the lengths of the surfaces 230a, 234a, 238a, 242a may generally increase from the insertion end to the non-stepped portion 204a. That is, the surface 230a of the first step 210a defines a first length L1, the surface 234a of the second step 214a defines a second length L2, the surface 238a of the third step 218a defines a third length L3, and the surface 242a of the fourth step 222a defines a fourth length L4. The first length L1 is less than the second length L2. The second length L2 is less than the third height L3. And, the third height L3 is less than the fourth height H4.

Because of the variety of heights of the first rail 160a, it follows that the first groove 170a also defines a variety of distances between the first guide surface and the third wall 128. As shown, the first groove 170b includes a first groove portion 280a defined between the surfaces 230a, 234a, 238a, 242a of the stepped portion 200a and the third wall 128, and a second groove portion 184a defined between the surface 246a of the non-stepped portion 204a and the third wall 128. Accordingly, the first groove portion 280a is positioned adjacent the insertion end and defines a distance that gradually decreases from the insertion end to the second groove portion 284a. The second groove portion 284a defines a distance that is substantially constant from the first groove portion 280a to the closed end 132. That is, a first distance D1 is defined between the surface 230a of the first step 210a and the third wall 128, a second distance D2 is defined between the surface 234a of the second step 214a and the third wall 128, a third distance D3 is defined between the surface 238a of the third step 218a and the third wall 128, and a fourth distance D4 is defined between the surface 242a of the fourth step 222a and the third wall 128. The second groove portion 284a defines a fifth distance D5. The first distance D1 is greater than the second distance D2. The second distance D2 is greater than the third distance D3. And, the fourth distance D4 is greater than the third distance D3. The fifth distance D5 is greater than the fourth distance D4.

Figure 8:
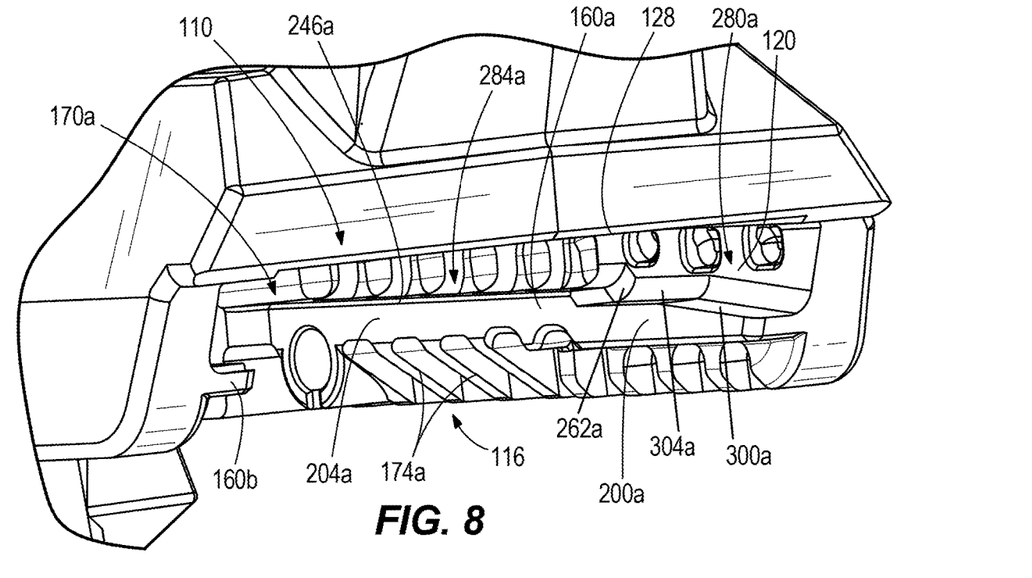
FIG. 8 is an elevation view of an insertion end of a battery pack receptacle of a power tool according to another embodiment.

The variable-height portion 200a may be achieved in other ways rather than a plurality of discrete steps. In one alternative embodiment, shown in FIG. 8, the variable-height portion 200a includes a ramped portion. That is, the variable-height portion 200a has a first ramped portion 300a and a second ramped portion 304a. The first ramped portion 300a gradually increases in height towards the second ramped portion 304a, while the second ramped portion 304a gradually increases in height towards the constant-height portion 204a. In the embodiment shown in FIG. 8, the slope of the first ramped portion 300a is steeper than the slope of the second ramped portion 304a. Alternatively, the slopes of the ramped portions 300a, 304a may be the same or substantially similar to define a single ramped surface from the insertion end toward the constant-height portion 204a.

Figure 9:
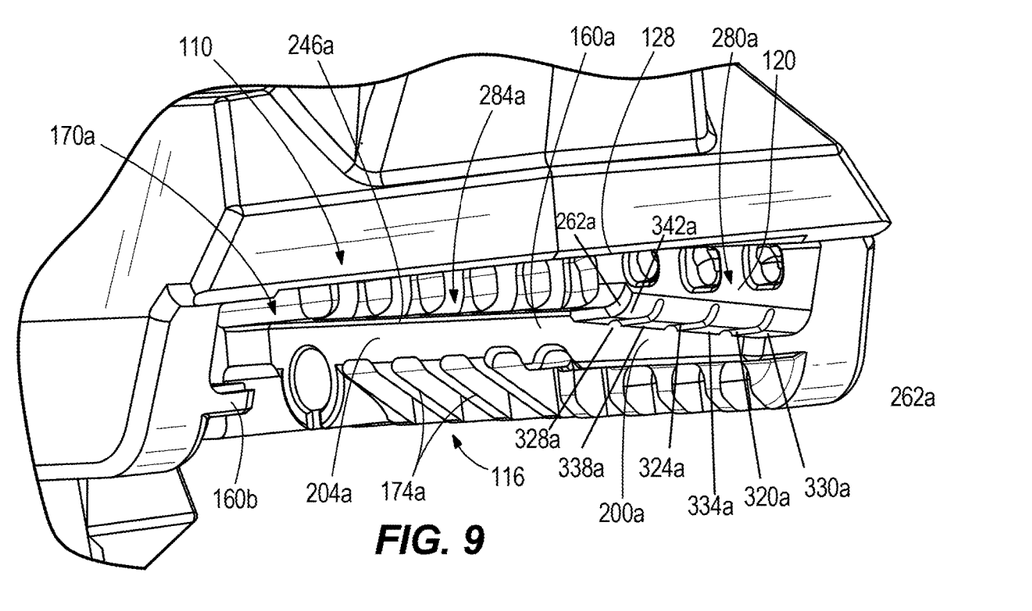
FIG. 9 is an elevation view of an insertion end of a battery pack receptacle of a power tool according to another embodiment.

In another alternative embodiment, shown in FIG. 9, the variable-height portion 200a includes a ramped portion that gradually increases in height from the insertion end to the constant-height portion 204a. Projections 320a, 324a, 328a extend from a surface of the ramped portion to delineate individual sections 330a, 334a, 338a, 342a of the ramped portion. In both of the embodiments of FIGS. 8 and 9, like the embodiments of FIGS. 1-2 and 4-7, an inclined surface 262a extends between the variable-height portion 200a to the constant-height portion 204a.

The stepped or ramped portions 200a, 200b of the rails 160a, 160b create multiple contact regions adjacent the insertion end of the battery pack receptacle 110. That is, each of the steps or ramped portions of the rails 160a, 160b creates a contact region adjacent the insertion end of the battery pack receptacle 110. The stepped portions and ramped portions distribute the load of the battery pack 26 at each of the multiple contact regions, rather than the edge at the insertion end where cracks may otherwise originate in power tools having straight rails. The battery pack receptacle 110 having the stepped portions or ramped portions may decrease the strain on the rails 160a, 160b by more than 75%, thereby protecting the integrity of the battery pack receptacle 110 and the housing 18 of the power tool 10 in general.

Although the present subject matter has been described in detail with reference to certain embodiments, variations and modifications exist within the scope of one or more independent aspects of the present subject matter, as described. Various features are set forth in the following claims.

What is claimed is:

1. A power tool battery pack receptacle comprising:
   a cavity in which a portion of a battery pack is receivable;
   an insertion end;
   a closed end opposite the insertion end along an insertion axis of the battery pack; and
   a rail extending between the insertion end and the closed end, the rail including a first portion having variable height and a second portion having a substantially constant height,
   wherein the first portion extends from the insertion end to the second portion and wherein the second portion extends from the first portion to the closed end,
   wherein the rail is configured to be received within a groove of the battery pack,
   wherein the first portion makes up less than a third of a length of the rail, and
   wherein a height of the first portion increases from the insertion end to the second portion, and wherein the first portion of the rail includes a plurality of contact regions such that the first portion distributes a load amongst each of the plurality of contact regions,
   wherein a surface of one of the plurality of contact regions transitions to a surface of the second portion by an inclined surface,
   wherein the first portion includes a first ramped portion that defines one of the plurality of contact regions and a second ramped portion that defines one of the plurality of contact regions, wherein the first ramped portion gradually increases in height from the insertion end to the second ramped portion, and wherein the second ramped portion gradually increases in height from the first ramped portion to the second portion, and wherein a slope of the first ramped portion is steeper than a slope of the second ramped portion.

2. The power tool battery pack receptacle of claim 1, wherein the rail is a first rail, and wherein the power tool battery pack receptacle further comprises a second rail extending between the insertion end and the closed end, wherein the second rail includes a first portion having a variable height and a second portion having a substantially constant height, wherein the first portion of the second rail is positioned adjacent the insertion end and the second portion of the second rail is spaced from the insertion end, and wherein the second rail is configured to be received within another groove of the battery pack.

3. The power tool battery pack receptacle of claim 1, wherein a width of the rail is substantially constant.

4. The power tool battery pack receptacle of claim 1, further comprising:
   a wall extending between the insertion end and the closed end of the receptacle; and
   a groove defined between the wall and a facing surface of the rail,
   wherein the groove includes a first groove portion and a second groove portion, wherein the first groove portion defines a variable distance between the first portion of the rail and the wall, and wherein the second groove portion defines a constant distance between the second portion of the rail and the wall.

5. The power tool battery pack receptacle of claim 1, further comprising a terminal block supported adjacent the closed end, the terminal block includes electrical terminals.

6. The power tool battery pack receptacle of claim 1, further comprising a latch opening adjacent the insertion end.

\* \* \* \* \*